Nov. 17, 1964     H. L. EMERY     3,157,174
MULTIPLE SECTION CUTTING TOOL
Filed May 31, 1962     2 Sheets-Sheet 1
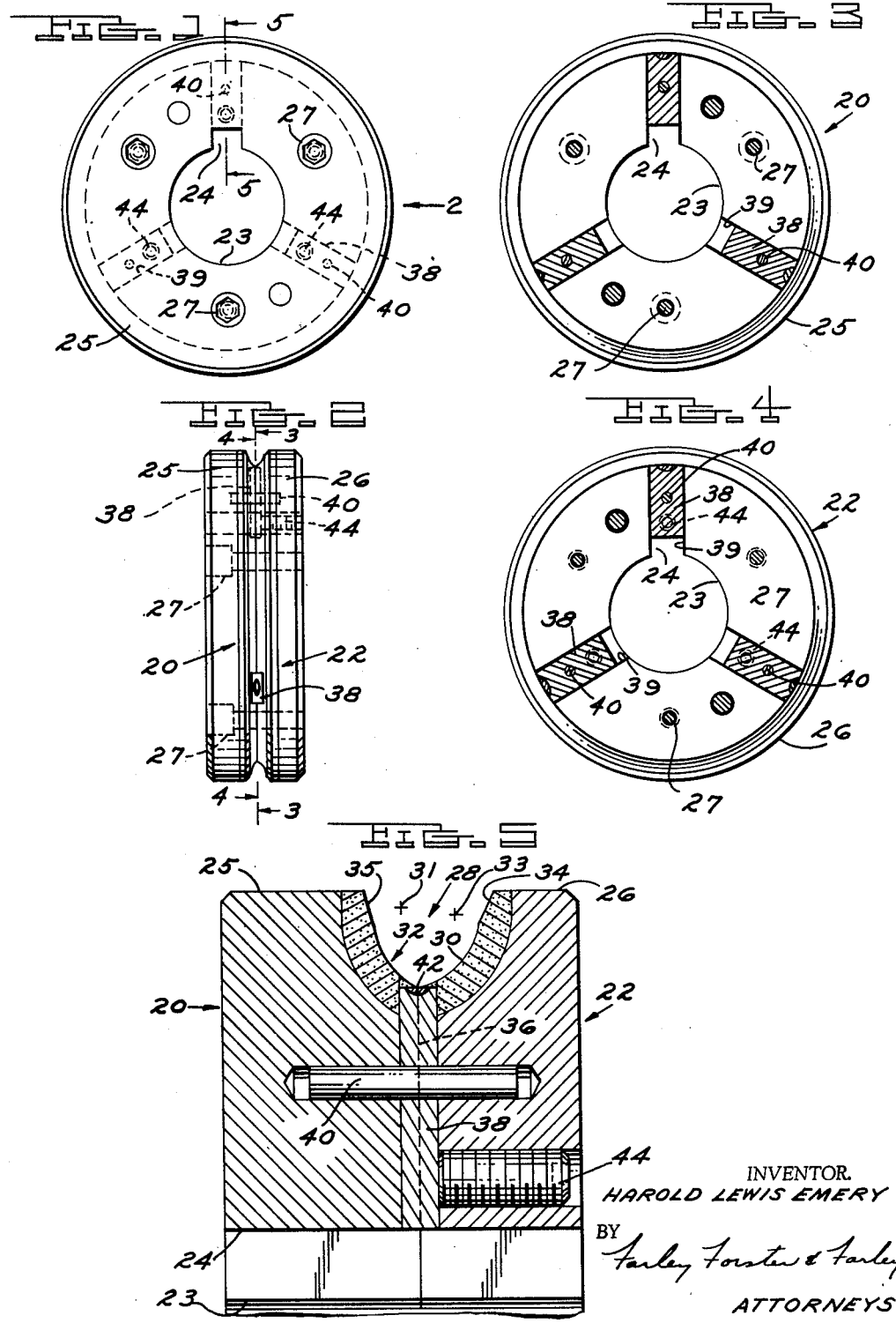
INVENTOR.
HAROLD LEWIS EMERY
BY
Farley Forster & Farley
ATTORNEYS

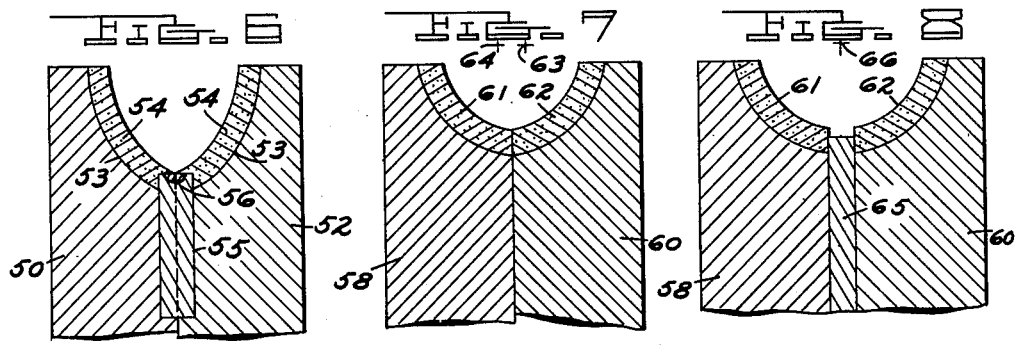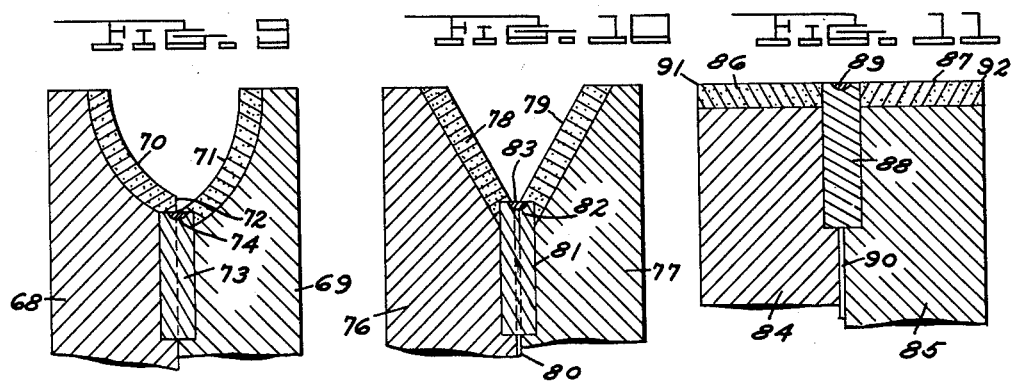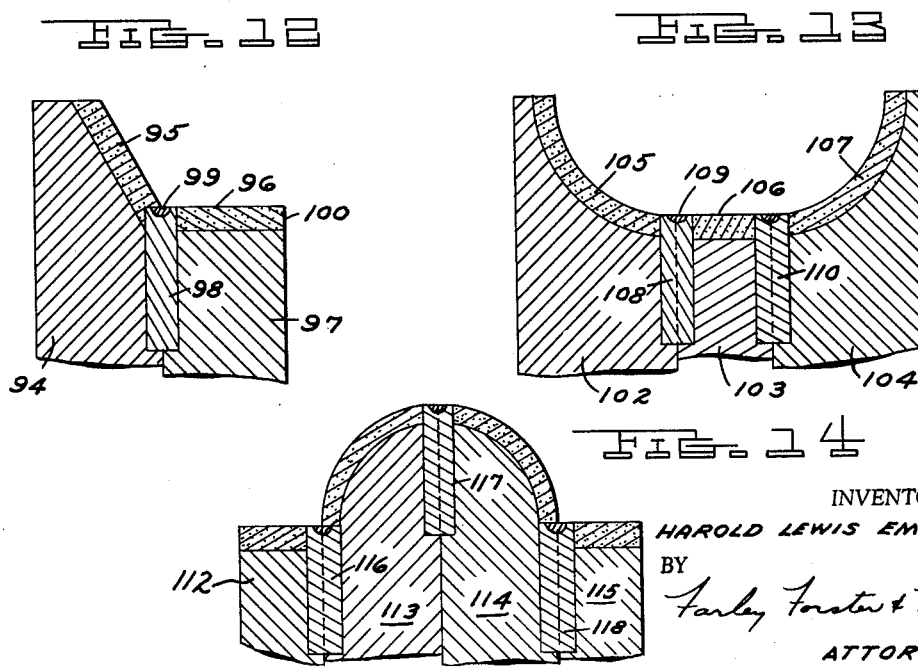

United States Patent Office 3,157,174
Patented Nov. 17, 1964

3,157,174
MULTIPLE SECTION CUTTING TOOL
Harold Lewis Emery, Warren, Mich., assignor to Koebel Diamond Tool Co., a corporation of Michigan
Filed May 31, 1962, Ser. No. 198,910
7 Claims. (Cl. 125—11)

This invention relates to an improved construction for a cutting tool of a type adapted to be mounted for rotation on an axis and having a peripheral surface provided with cutting means mounted thereon, in which the body portion of the tool is formed by a plurality of sections joined together in axial end-to-end relation, with each section forming a part of the peripheral cutting surface. The construction of the invention has particular utility for wheel dressing tools in which the cutting surface is provided with a plurality of individually mounted diamonds, or with diamond particles held in a binder, and therefore the invention will be illustrated in its application to this type of tool.

Such cutting tools are frequently required to be provided with a cutting surface having one or more of the following characteristics: (1) a recess with arcuate side walls formed on spaced-apart centers; (2) angularly related intersecting portions; (3) some combination of anguarly related curved and straight surface portions; and (4) portions spaced axially by a critical dimension. For tools having cutting surfaces subjected to any such requirements, the invention provides a construction which simplifies and reduces the cost of manufacturing the tool and increases its service utility.

In this construction the body of the tool is composed of two or more sections each having a peripheral surface concentric with the axis of tool rotation, with cutting means carried on at least a portion of the peripheral surface of each section. Means are provided for detachably securing the body sections together in end-to-end axially aligned relation whereby the cutting means on each section may be individually formed or reformed, and axially positioned relative to each other during the manufacture and useful life of the cutting tool. In most instances the parting line between adjacent body sections will extend through the peripheral cutting surfaces of the tool, and in such cases the invention also provides an insert member mounted between adjacent body sections and equipped with a cutting device on the outer end thereof, the insert member being rigidly secured to the body sections so that the cutting device bridges the parting line between adjacent sections, and forms a continuation of the cutting surface across the parting line to remove any trace of the parting line on a work piece.

Other features ad advantages of the invention will appear from the following description of the representative embodiments thereof disclosed in the accompanying drawings which consist of the following views:

FIGURE 1, an end elevation of the cutting tool;

FIGURE 2, a side elevation of the construction shown in FIGURE 1;

FIGURES 3 and 4, end elevations of the individual body section taken as indicated by the arrows 3—3 and 4—4 respectively of FIGURE 2;

FIGURE 5, an enlarged sectional elevation taken as indicated by the line 5—5 of FIGURE 1;

FIGURE 6, a fragmentary sectional elevation, similar to FIGURE 5 but more schematic, illustrating an alternate configuration of the cutting surface;

FIGURE 7, a view similar to FIGURE 6 showing another cutting surface configuration;

FIGURE 8, a view of the construction of FIGURE 7 illustrating how the cutting surface thereof may be formed or reformed;

FIGURES 9-14, sectional views each similar to FIGURE 6 showing some other forms of cutting surface advantageously obtained by the construction of the invention.

Referring to FIGURES 1-5, the rotary type tool illustrated consists of a body formed in two sections 20 and 22 each provided with a center bore 23 and keyway 24 for mounting the tool on an axis of rotation. Body members 20 and 22 have peripheral surfaces 25 and 26 respectively, formed concentric with the axis of the bore 23, and the body sections are detachably connected together in axially aligned end-to-end relation by screws 27.

The tool illustrated is designed for dressing a grinding wheel which in turn is used to grind a drill flute, and to perform this function the tool must be provided with a peripheral recessed cutting surface of complex configuration, best shown in FIGURE 5 and indicated generally by the reference 28. This cutting surface is formed by conventional cutting means—either individual diamonds set in a matrix, or diamond particles held in a binder, and with a tool of ordinary one-piece construction, a recess having a configuration such as illustrated is very difficult to form to the degree of accuracy required which may run as high as fifty millonths of an inch. Once the tool has been placed in service, it is also very difficult and sometimes impossible to rework the cutting surface to compensate for ordinary wear or to repair damage. The present construction alleviates these difficulties to a great extent.

Referring to FIG. 5, the recessed cutting surface 28 consists of an arcuate portion 30 formed on a center 31, a second arcuate portion 32 formed on a differently located center 33 and on a different radius, with differently tapered entrance portions 34 and 35 leading inwardly to the arcuate portions 30 and 32 respectively. The sections 20 and 22 of the tool body are formed so that the parting line 36 between them lies at the apex or intersection of the arcuate recessed portions 30 and 32, thus permitting these portions to be individually generated.

In the preferred construction, a plurality of insert members 38 are mounted between the sections 20 and 22 of the tool body, as best shown in FIGS. 3-5. Each of the body portions 20 and 22 is provided with a radially extending slot 39 for each insert member 38, and a pin 40 extends through each of the body members and through the inserts 38 to locate the insert radially in the slots 39 in a position where a cutting device—in this case a diamond 42—mounted on the outer end of the insert is positioned on the line of intersection between the arcuate cutting portions 30 and 32 and bridges the parting line 36 between the tool body sections 20 and 22. The cutting function of the diamond on each insert is to prevent any trace of the parting line between the tool body sections from appearing on a work piece. A set screw 44 is employed to take up any clearance between each insert member and the slots in which it is mounted.

When the tool body sections 20 and 22 have been formed, cutting means applied to the cutting surface portions thereof and accurately shaped, and the insert members 38 precisely formed, the tool is assembled as shown, with the body sections 20 and 22 being secured together by screws 26 and the inserts positioned by the pins 40 and set screws 44. The tool assembly is then checked and any necessary minor corrections to the cutting surfaces made. After the tool has been placed in service, reshaping of the cutting surfaces will be necessary from time to time due to ordinary wear. This work is greatly facilitated, since the tool can be disassembled making each portion of the recess 28 individually accessible. In case of damage during service, disassembling the tool makes it possible to repair any damaged part of the cutting surfaces and restore them to their original state of accuracy. Many repairs cannot be made to a tool having a recessed portion of such complex contour formed in a one-piece tool body.

FIGS. 6–14 are illustrative of other cutting tools in which the construction of the invention may be adtageously employed. These constructions and their advantages will be briefly summarized, it being understood that while all constructional details are not shown in these views, such details would be similar in principle to those disclosed in FIGS. 1–5.

FIG. 6 illustrates a cutting tool formed of two body sections 50 and 52 each having a circular peripheral portion 53 on which cutting means 54 are mounted and shaped to form cutting surfaces generated by arcs of equal radius on side-by-side centers. The recess thus formed has the appearance in section of a gothic arch, and one or more insert members 55 equipped with a cutter 56 at the outer end thereof are mounted as previously described to eliminate any trace of the parting line on a work piece.

FIGS. 7 and 8 show a similar tool having body sections 58 and 60 provided with cutting surfaces 61 and 62 respectively which again form a recess in the shape of a gothic arch. Cutting surface 61 is generated on a radius from the center 63, and cutting surface 62 is generated on an equal radius from a center 64. No insert member is used in this construction, it being assumed that any trace of the parting line between the sections 58 and 60 would not be objectionable for the service required of this tool.

FIG. 8 illustrates the ease with which the surfaces 61 and 62 may be generated in initial manufacture or reworked in service. A shim 65 whose thickness equals the spacing between the centers 63 and 64, is inserted between the tool body sections 58 and 60, thus permitting the arcuate surfaces 61 and 62 to be generated about a common center 66. A recess of this type will be recognized as one frequently employed for ball races.

FIG. 9 illustrates a tool with a recess having a configuration which would be extremely difficult to form in a tool having a solid body. The tool is divided into two body sections 68 and 69, body section 68 being provided with an arcuate cutting surface 70 generated by an arc of one radius at one center and body section 69 being provided with an arcuate cutting surface 71 generated on a different center which is displaced radially from the first center a distance sufficient so that a distinct step 72 is formed at the intersection of the two surfaces 70 and 71. An insert member 73 is preferably employed having its cutting element 74 positioned on and bridging the line of intersection between the cutting surfaces of the respective body sections.

In FIG. 10, the two tool body sections 76 and 77 are each provided with cutting surface portions 78 and 79 respectively which are oppositely inclined axially of the tool to form a V-shaped notch and the body sections are spaced apart by a shim 80. An insert member 81 is employed and in this instance its cutting element 82 performs more than a wiping function. It bridges the separation between the body sections 76 and 77 and defines a distinct flat 83 at the bottom of the notch.

The tool shown in FIG. 11 has two body sections 84 and 85 having cutting surface portions 86 and 87 respectively which lie equidistant from and parallel to the axis of tool rotation. An insert member 88 is mounted between the body sections 84 and 85 with a cutting element 89 bridging the parting line between the body sections and forming part of the cutting surfaces 86 and 87. Such a construction would have particular advantage in a case where the tool was to be used for forming a pair of accurately spaced shoulders defined by the corners 91 and 92 of the cutting surfaces 86 and 87 respectively. In such case the corners 91 and 92 would be subject to wear which would cause the tool to be discarded or completely rebuilt after the dimensional tolerance was exceeded. With the present construction, the tool body sections 84 and 85 can be disassembled and reassembled with a shim 90 of suitable thickness between them and the corners 91 and 92 reshaped. The resulting separation will not appear on the work-piece because of the bridging action of the cutting element 89 of the insert member 88.

FIG. 12 further illustrates the advantages mentioned in connection with FIG. 11. Tool body section 94 is provided with an axially inclined cutting surface portion 95 which intersects an axially parallel cutting surface 96 on the tool body section 97. An insert 98 with cutting element 99 is mounted between the body sections. If one function of this tool is to hold dimensional accuracy between the radial edge 100 of the cutting surface 96 and the angularly extending cutting surface 95, shims can again be employed between the body sections 94 and 97 and the cutting element 99 of the insert member will compensate for the resulting separation of the body sections.

FIGS. 13 and 14 illustrate the fact that a tool constructed in accordance with the invention may be formed with any number of body sections desired, a separate body section being in general employed whenever the configuration of the desired cutting surface changes in geometry or direction. In FIG. 13 the tool consists of three body sections 102, 103 and 104 each having respective cutting surface portions 105, 106 and 107. One or more insert members 108 are mounted between the body sections 102 and 103 with cutting element 109 extending across the parting line; and likewise an insert member or members 110 is mounted between the body sections 103 and 104.

In FIG. 14 the tool consists of four body sections 112, 113, 114 and 115. The service life of this tool can again be materially increased by the employment of shims between any adjacent pair of these body sections, since the insert members 116 between the sections 112 and 113, 117 between the sections 113 and 114, and 118 between the sections 114 and 115 are each adapted to perform the dual function of removing any trace of the parting line between the adjacent sections between which they are mounted and of compensating for any axial adjustment between such adjacent sections as may be required in service to maintain dimensional specifications between various portions of the composite cutting surface.

To summarize the principal features and advantages of the invention, the employment of multiple body sections (1) makes it possible to more easily and accurately generate cutting surfaces defined by a plurality of arcs on different centers and having different radii; (2) makes it easy to form recessed cutting surfaces whose shape is defined by a pair of arcs having an equal radius but generated from axially spaced-apart centers in a single operation by separating the body sections for manufacture and reworking with a shim whose thickness equals the axial spacing between centers.

One or more insert members each having a separate cutting element can be employed in combination with the multiple section body and mounted between each adjacent pair of sections so as to prevent any trace of the section parting line from appearing on a work piece.

Such inserts can also be employed to define a separate part of a composite cutting surface lying intermediate the cutting surface portions of the tool body sections.

Such inserts can also be employed to permit axial adjustment or spacing between adjacent body sections in order to compensate for axial wear of the cutting surface portions thereof, providing a separate cutting surface which bridges the axial separation.

Other features and advantages will naturally appear to those skilled in this art and therefore such changes and modifications from the constructions illustrated which are within the scope of the following claims are to be considered a part of the present invention.

I claim:

1. A rotary cutting tool of the type adapted to be mounted for rotation on an axis comprising a body composed of at least a pair of sections each having a circumferential surface formed about said axis with cutting means mounted thereon, means for detachably securing said sections together in end-to-end axially aligned relation whereby said cutting means may be individually formed, reformed and axially repositioned relative to each other as necessary during the life of the tool, an insert member having a cutting element mounted thereon, and means detachably securing said insert member to the tool body with said cutting element bridging the parting line between said body sections and forming a portion of the cutting means thereof.

2. A cutting tool according to claim 1 wherein said cutting means and said cutting element consist of diamonds.

3. A cutting tool according to claim 1 wherein the means for detachably securing said insert member to the tool body comprises a slot formed in adjacent radially extending surfaces of said body sections, and a fastening device engaging said insert member and each of said body sections when said body sections are secured together in end-to-end relation.

4. A cutting tool according to claim 1 further characterized by shim means mounted between said pair of body sections to form an axial separation between the cutting means thereof, the cutting element of said insert member bridging such separation.

5. A rotary cutting tool comprising a body composed of at least a pair of sections each having a generally circular outer periphery and a radially extending end face, means detachably securing said body sections together in end-to-end axially aligned relation with the said end faces of the body sections adjacent each other, cutting means circumferentially mounted around adjacent peripheral surface portions of the pair of body sections, an insert member, means mounting said insert member between the pair of body sections, and a cutting element mounted on the outer end of the insert member and positioned between the adjacent peripheral surfaces of the body sections to form a continuation of the cutting means thereof on the parting line between the body sections.

6. A rotary cutting tool having a circumferential cutting portion of recessed gothic arch configuration, characterized by the body of the tool being separated on the apex of said arch to form a pair of body sections, each body section having an arcuate circumferential surface constituting one-half of said arch, said arcuate surfaces being defined by equal radii on axially spaced centers, and means detachably connecting said body sections together in end-to-end axially aligned relation whereby said arcuate surfaces may be formed and reformed with reference to a common center by the insertion of shim means between said body sections, said shim means having a thickness equal to the distance between said centers.

7. A rotary cutting tool comprising a body composed of at least a pair of sections each having a generally circular outer periphery and a radially extending end face, means detachably securing said body sections together in end-to-end axially aligned relation with the said end faces of the body sections adjacent each other, cutting means circumferentially mounted around adjacent peripheral surface portions of the pair of body sections, shim means mounted between the pair of body sections to form a separation therebetween, an insert member, means mounting said insert member between the pair of body sections, and a cutting element mounted on the outer end of the insert member and positioned between the adjacent peripheral surfaces of the body sections to form a continuation of the cutting means thereof across the separation between the body sections.

References Cited in the file of this patent

UNITED STATES PATENTS

| | | |
|---|---|---|
| 2,770,925 | Wallace et al. | Nov. 20, 1956 |
| 2,776,529 | Osplack | Jan. 8, 1957 |
| 3,017,875 | Jones | Jan. 23, 1962 |